(12) United States Patent
Dick

(10) Patent No.: US 7,072,327 B2
(45) Date of Patent: Jul. 4, 2006

(54) CONTENTION ACCESS CONTROL SYSTEM AND METHOD

(75) Inventor: Stephen G. Dick, Nesconset, NY (US)

(73) Assignee: InterDigital Technology Corporation, Wilmington, DE (US)

(*) Notice: Subject to any disclaimer, the term of this patent is extended or adjusted under 35 U.S.C. 154(b) by 977 days.

(21) Appl. No.: 09/995,144

(22) Filed: Nov. 27, 2001

(65) Prior Publication Data

US 2002/0080748 A1 Jun. 27, 2002

Related U.S. Application Data

(60) Provisional application No. 60/253,347, filed on Nov. 28, 2000.

(51) Int. Cl.
*H04J 3/00* (2006.01)

(52) U.S. Cl. .................................. 370/345; 370/431

(58) Field of Classification Search ................ 370/337, 370/345, 395.2, 395.21, 395.4, 439, 442, 370/458, 461, 462, 498, 336, 448
See application file for complete search history.

(56) References Cited

U.S. PATENT DOCUMENTS

| | | | |
|---|---|---|---|
| 5,862,452 A | 1/1999 | Cudak et al. | |
| 6,212,399 B1 * | 4/2001 | Kumar et al. ............... | 455/522 |
| 6,285,662 B1 * | 9/2001 | Watanabe et al. ........... | 370/280 |
| 6,529,520 B1 * | 3/2003 | Lee et al. ................... | 370/442 |
| 6,606,314 B1 * | 8/2003 | Bahrenburg et al. ........ | 370/347 |
| 6,674,765 B1 * | 1/2004 | Chuah et al. ............... | 370/458 |
| 6,690,661 B1 * | 2/2004 | Agarwal et al. ............ | 370/337 |
| 6,819,676 B1 * | 11/2004 | Min ........................... | 370/448 |
| 2001/0034235 A1 * | 10/2001 | Froula ........................ | 455/446 |

FOREIGN PATENT DOCUMENTS

WO 00/56103 9/2000

OTHER PUBLICATIONS

3rd Generation Partnership Project; Technical Specification Group Radio Address Network; RRC Protocol Specification, 3GPP TS 25.331 V3.8.0 (Sep. 2001); pp. 1-2, 50-51, 54, 184-193, 321-322, 413, 430-432, 436-437, 603, 606, 610-613, 615 & 622.

* cited by examiner

*Primary Examiner*—Huy D. Vu
*Assistant Examiner*—Blanche Wong
(74) *Attorney, Agent, or Firm*—Volpe and Koenig, P.C.

(57) ABSTRACT

In telecommunications systems, User Equipments (UEs) communicate with a common station via wireless communication signals which have a system frame format. Commonly used time slots (CUTSs) are available for common use by the UEs for transmitting code identified signals for a specific uplink channel. The UEs select a code identifier from a plurality of identifiers, such as midambles. A UE transmission with a selected code identifier in a selected CUTS will fail if another UE transmits with the same code identifier in the same CUTS or if the UE transmission lacks sufficient power. Communication efficiency is enhanced by determining the number of successful and failed UE transmission in CUTSs per frame and adjusting one or more communication parameters in response to said determination such as a parameter upon which the UEs determine an access rate for transmitting in CUTSs and/or a power control parameter.

20 Claims, 4 Drawing Sheets

CONTENTION ACCESS CONTROL SYSTEM AND METHOD

CROSS-REFERENCE TO RELATED APPLICATION

This application claims priority from U.S. Provisional Patent Application Ser. No. 60/253,347, filed on Nov. 28, 2000.

FIELD OF INVENTION

The present invention relates to telecommunication systems, and in particular, systems using a system frame format with at least one commonly used time slot which is available for common use by multiple users for transmitting code identified signals for a specific uplink channel and methods for controlling communications based upon determining the number of successful and failed transmissions in the commonly used time slots.

BACKGROUND

Telecommunication systems where multiple users communicate with a common communication station are well known in the art. Such systems are defined by the specifications for the Third Generation Partnership Project (3GPP). In a 3GPP system, a number of user equipment (UEs) can be camped on a system cell for communication with a Radio Network Controller (RNC) via various channels including an uplink Random Access Channel (RACH). For example. FIG. 5 illustrates a typical 3GPP system called a Universal Mobile Telecommunications Systems (UMTS).

As shown if FIG. 5. a typical UMTS system architecture includes a Core Network (CN) interconnected with a UMTS Terrestrial Radio Access Network (UTRAN) via an interface known as Iu which is defined in detail in the publicly available 3GPP specification documents. The UTRAN is configured to provide wireless telecommunication services to users through so-called User Equipments (UEs) in 3GPP. via a radio interface known as Uu. The UTRAN has base stations, known as Node Bs in 3GPP, which collectively provide for the geographic coverage for wireless communications with UEs. In the UTRAN, groups of one or more Node Bs are connected to a Radio Network Controller (RNC) via an interface known as Iub in 3GPP. The UTRAN may have several groups of Node Bs connected to different RNCs, two are shown in the examvle depicted in FIG. 5. Where more than one RNC is provided in a UTRAN, inter-RNC communication is performed via an Iur interface having two RNCs in a UTRAN, inter-RNC communication is performed via an Iur interface.

Wireless communication with UEs in a 3GPP system is conventionally done utilizing the transmission of successive radio frames divided into timeslots as illustrated in FIG. 6. The system may be configured with commonly used time slots (CUTSs) such as illustrated in FIG. 7, preferably one such time slot for each system frame, which are commonly available to the UEs for Random Access Channel (RACH) transmission. As shown in FIG. 7, a typical CUT is configured with a midamble sandwiched between two data portions with a Guard Period (GP) provided for facilitating timing adjustments A UE may attempt a RACH transmission and select a RACH CUTS of a random frame using one of N code identifiers, for example, one of eight midambles. If no other UE transmits in the same slot with the same midamble and if there is sufficient Signal to Noise Ratio (SNR), then the UE's RACH transmission succeeds. If another UE transmits in the same slot with the same midamble, then they both fail. If another UE transmits in the same time slot with a different midamble, then they both succeed provided that they each have sufficient SNR.

If a UE transmits in a time slot and there are N other UEs also transmitting in that slot, assuming that there is more than adequate SNR, then the probability of a UE succeeding is $P=(1-1/M)^N$, where M is the number of code identifiers (e.g. eight (8) midambles for a preferred 3GPP system) and N is the number of other UEs transmitting. The average number of successes per time slot is:

$$N_{\textit{eff}} = N(1-1/M)^N \qquad \text{Equation 1}$$

This can be extended to consider rates of accesses per second. For example, from a UE's perspective, if it can transmit on a RACH channel characterized by 8 codes per slot and one slot per frame, there are 800 resources available per second for 3GPP standard 10 microsecond frames. Then N may be the average number of accesses per second and M may be the number of resources, i.e. 800 in the example. As M gets large, a frequently used approximation is valid:

$$P=exp(-N/M) \qquad \text{Equation 2}$$

It is well known that under these assumptions, the maximum success rate occurs when N=M and this rate is Pmax=M/e. However, there is a cost for operating at this level. The average UE will experience several failures before it succeeds and time delay becomes an issue. The time delay is composed of the time it takes to for the UE to identify that it has not succeeded plus the time for a retry, and this delay may occur more than once (i.e. there may be several failures).

In 3GPPP there is a relatively long layer three (3) acknowledgment time, on the order of seconds, so that the recommended operating condition for the RACH, at least the basic access channel, is preferably biased towards having very few collisions. Preferably, the system will operate in the neighborhood of no more than one access attempt per RACH time slot. For a standard 3GPP system frame of 10 microseconds, this translates to a rate of 100 accesses per second.

In 3GPP, TS 25.331, a parameter of dynamic persistence (DP) is defined which is set by the Radio Network Controller (RNC) to avoid saturation of the Random Access Channel. The RNC broadcasts DP or a DP level to the UEs and the UEs adjust their rate of access to the RACH time slots as a function of DP. The inventor has recognized that the rate of access can be changed to produce more efficient communication by adjusting DP based upon the number of successful and failed RACH transmissions.

The inventor has also recognized that insufficient SNR which causes failed RACH transmissions can be the result of the UEs transmitting with insufficient power. In 3GPP, TS 25.331, a RACH Constant parameter is defined which is broadcast by the RNC and is used by the UEs to determine the power of RACH transmissions. The inventor has recognized that more efficient communications can result by adjusting the RACH Constant based upon successes and failures of RACH transmissions.

SUMMARY AND OBJECTS OF THE INVENTION

In telecommunications systems, such as one specified by the Third Generation Partnership Project (3GPP), a plurality of User Equipment (UEs) communicate with a common station, such as a common Radio Network Controller (RCN) via communication signals which have a system frame format. Commonly used time slots (CUTSs), preferably one per system frame, are available for common use by the UEs for transmitting code identified signals for a specific uplink channel, such as a Random Access Channel (RACH).

The UEs select a code identifier from a plurality of identifiers. Preferably, the UEs use midamble chip sequences as code identifiers in this context. A UE transmission with a selected code identifier in a selected CUTS will fail if another UE transmits with the same code identifier in the same CUTS or if the UE transmission lacks sufficient power. The invention provides more efficient communication by determining the number of successful and failed UE transmission in CUTSs per frame and adjusting one or more communication parameters in response to said determination.

In one embodiment, the number of successful and failed UE transmissions in CUTSs is determined for individual system frames. A parameter DP, upon which the UEs determine an access rate for transmitting in CUTSs, is broadcast and DP is adjusted in response to individual system frame determination.

In another embodiment, the number of successful and failed UE transmissions in CUTSs is determined for multiple system frames spanning a selected time interval. Preferably, the system frame is 10 microseconds and the selected time interval is 1 second so that the determination is based upon 100 frames. Preferably, eight midambles are provided as code identifiers for UE transmissions.

With the latter embodiment, preferably a power control parameter RACH Constant is broadcast to the UEs and the RACH Constant is adjusted in response to the determination over the selected time interval whereby the UEs adjust their transmission power after receiving an adjusted value for RACH Constant parameter in accordance with that adjusted value. In addition to or in lieu of power control, the parameter Dynamic Persistence, DP, upon which the UEs determine an access rate for transmitting in CUTSs, is broadcast. The Dynamic Persistence is adjusted in response to either success/fail determinations for individual frames or determinations over the selected time interval whereby the UEs adjust their access rate to CUTS after receiving an adjusted value for Dynamic Persistence in accordance with that adjusted value.

Other objects and advantages of the present invention will be apparent from the following description of presently preferred embodiments.

DETAILED DESCRIPTION OF THE PREFERRED EMBODIMENTS

A communications system is provided where a plurality of User Equipment (UEs) communicate with a common station via communication signals having a system frame format. For a specific uplink channel, commonly used time slots (CUTSs), preferably one per system frame, are available for common use by the UEs for transmitting code identified signals for that specific channel.

Figure 5:
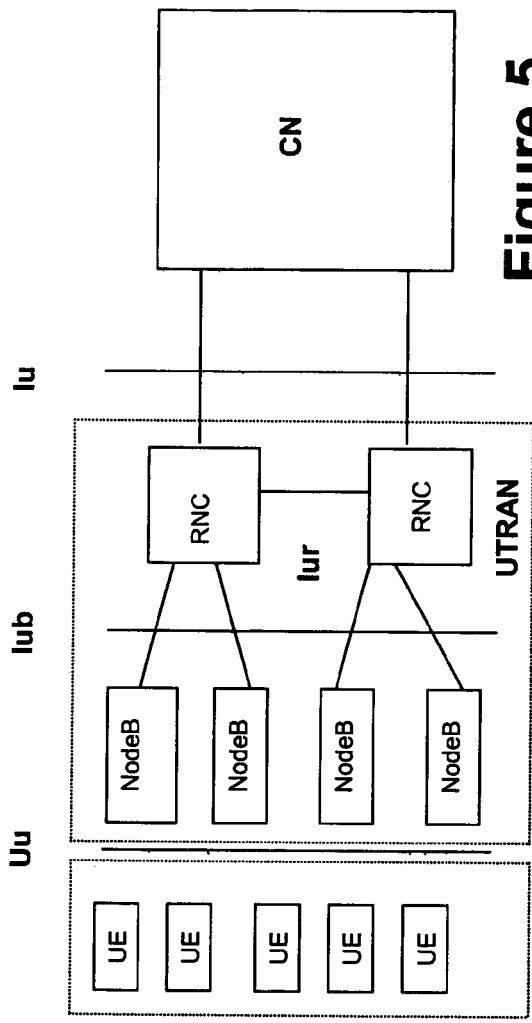
FIG. 5 is a schematic diagram of a typical UMTS system in accordance with 3GPP specifications.
Figure 6:
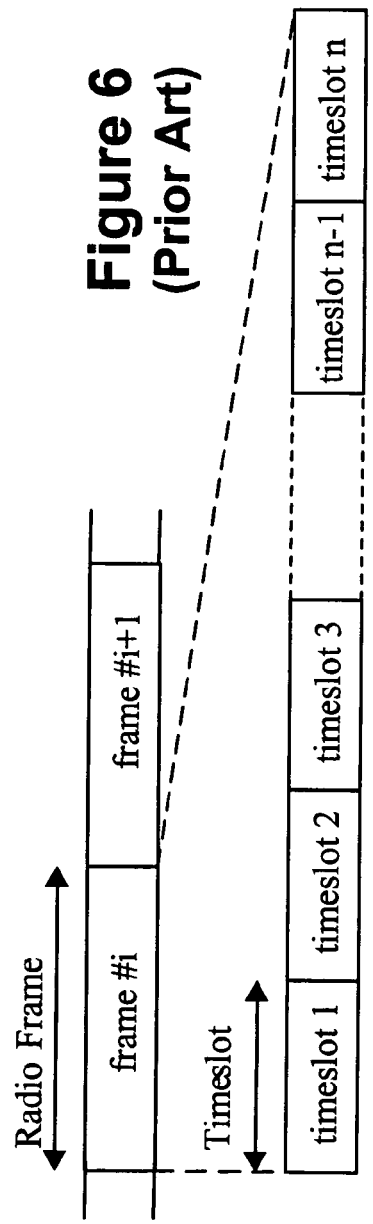
FIG. 6 is a schematic diagram of a typical radio frame format for a UMTS system in accordance with 3GPP specifications.
Figure 7:
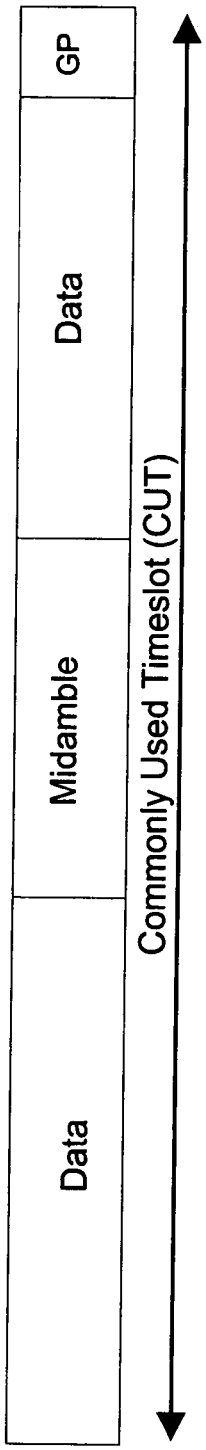
FIG. 7 is a schematic diagram of a typical commonly used time slot (CUT) used in the radio frame format of FIG. 6.
Figure 8:
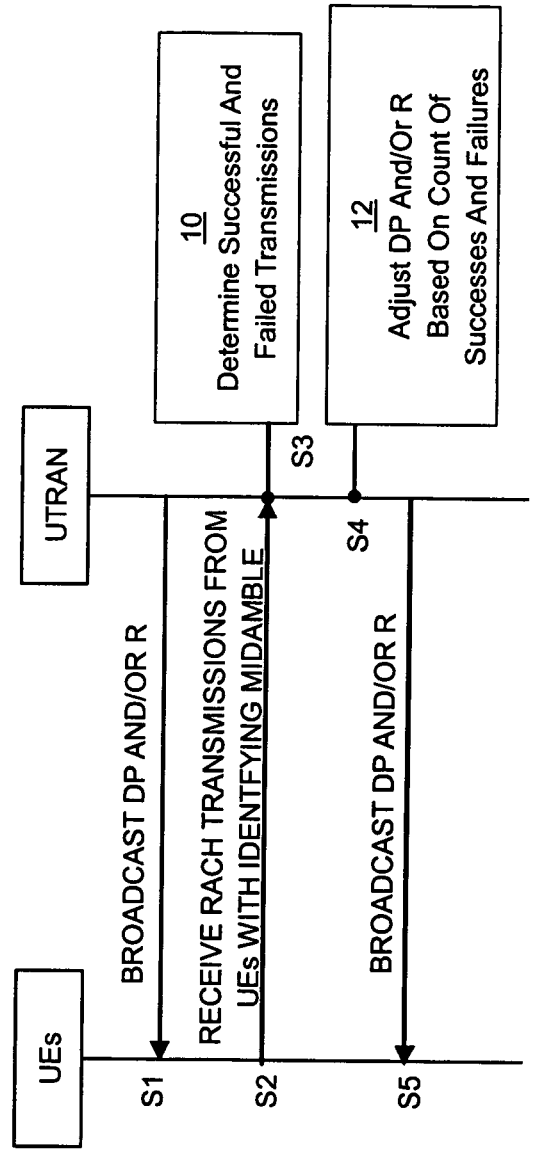
FIG. 8 is a schematic illustration of the adjustment of Dynamic Persistence parameter (DP) in accordance with the invention.

In a Third Generation Partnership Project (3GPP) system, such as illustrated in FIG. 5 and particularly as specified in TS 25.331, the invention is particularly applicable for a Random Access Channel (RACH) operating in Time Division Duplex (TDD) mode. In 3GPP, RACH is an uplink channel by which the UEs communicate to a node B which is controlled by a radio network controller (RNC) via an Iub interface. The node B, Iub and RNC combination can be viewed as a common station with which the UE's communicate, generally identified as the UTRAN as illustrated in FIGS. 5 and 8. Preferably, computer memory is provided in the RNC to collect the statistics referenced below in conjunction with FIGS. 1 and 2. As illustrated if FIG. 8, the node B contains processing circuitry 10 to determine whether RACH transmissions pass or fail a cyclic redundancy check (CRC) and the RNC includes processing circuitry 12 which adjusts the various parameters, such as DP and R, based on RACH pass/fail related data stored in the RNC memory as discussed below.

For RACH communications, the UEs utilize code identifiers in the form of midamble chip sequences. Preferably eight different midambles are available for selection by the UEs for RACH transmissions.

The UE rate of access to CUTSs and the UE RACH transmission power are controlled by the UEs based upon various parameters. In a 3GPP system, a parameter Dynamic Persistence (DP) is defined and the UE rate of access to CUTSs is a function of DP. Also, a parameter RACH Constant is defined and the UE RACH transmission power is set as a function of RACH Constant. DP (or a DP level) and RACH Constant (R) are broadcast to the UEs from data provided by the RNC as illustrated at step S1 of FIG. 8.

In the present invention, parameters such as DP and/or RACH Constant are adjusted based upon determining the number of successes and failures of UE RACH transmissions. The Iub permits the transmission of RACH messages, which fail a cyclic redundancy check (CRC). Accordingly, the associated RNC can count both successful and failed RACH transmissions from the UEs. An example of this is schematically illustrated in FIG. 8 where at step S2 the RACH transmissions are receive from the UEs in conjunction with step S3 where the processing circuitry 10 determines if the transmission is a success or failure. As explained in detail below, the processing circuitry 12 then adjusts the DP parameter based on the successes and failures, step S4. The adjusted DP is then broadcast to the UEs, step S5 as explained below.

For simplicity, a preferred configuration for a 3GPP system of one RACH time slot per frame with eight (8) code identifying midambles is used for illustration and explanation. For each such frame, the applicable measurements are:

1) number of correctly received RACH messages, (correct CRC), and
2) number of incorrectly received RACH messages, (incorrect CRC).

Figure 1:
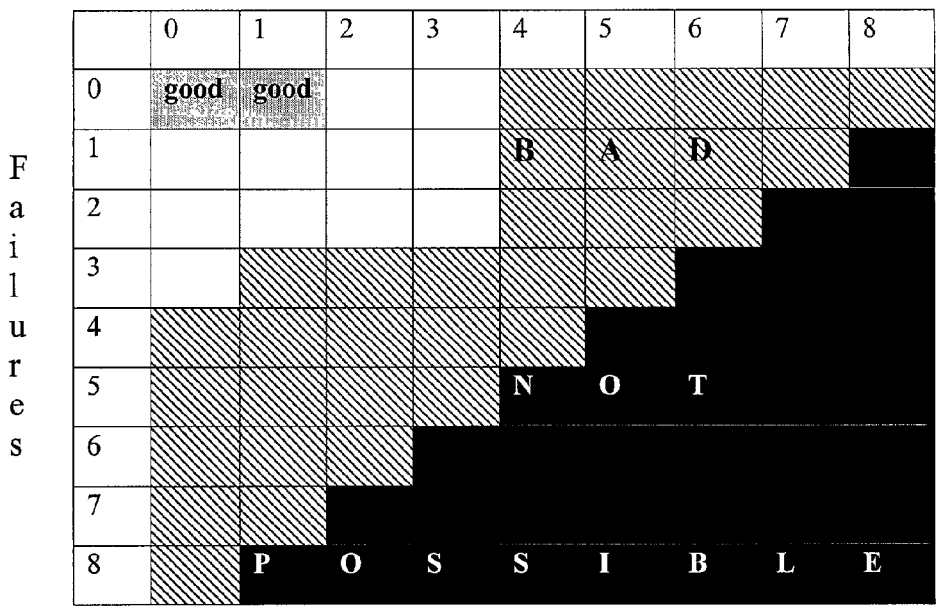
FIG. 1 is a table representing preferred performance criteria for adjusting communication parameters in accordance with the present invention for individual system frames having one RACH access slot and eight code identifiers.

As shown in FIG. 1, an N×N matrix is defined where N is the maximum theoretical number of RACH messages to be supported; N being illustrated as 8 in FIG. 1. Preferably for one RACH slot per frame, N is 4 or 8.

In FIG. 1, the horizontal variable is the number of successful RACH messages and the vertical variable is the number of failed RACH messages. The only valid entries are those where the sum of the two is less than or equal to N. Therefore, the boxes in black are not possible.

In a first embodiment of the invention, a determination of the number of correct and failed RACH transmissions for individual time frames is made. A comparison of the results against the table of FIG. 1 is then used to adjust the DP parameter. For each possible case represented in the table of FIG. 1, there is one of the following three actions: 1) increase dynamic persistence; 2) decrease dynamic persistence; or 3) no change. If the determination results for a time frame fall within the diagonal shaded blocks indicated as "bad", dynamic persistence should be increased. If the results fall within the shaded blocks indicated as "good", dynamic persistence should be decreased. If the results fall within the blank blocks, no change in dynamic persistence should be made. It is preferred to use a two-dimensional input for computational ease.

It is preferred to alter the DP parameter only after a certain amount of net accumulated increase or decrease indications have been determined. Accordingly, after the measurements of successful and failed RACH messages for each frame are performed, a parameter temp dynamic persistence, which is preferably initialized with the initial value of DP, is incremented in accordance with Equation 8.

> temp dynamic persistence=temp dynamic persistence+DeltaP      Equation 8 where DeltaP is:
a positive increment for an increase of dynamic persistence,
a negative increment for a decrease of dynamic persistence, and
zero (0) for no change of dynamic persistence.

When the absolute value of the difference between DP and temp dynamic persistence meets or exceeds a threshold T, |DP−temp dynamic persistence|>T, then DP is changed and the changed value is broadcast to the UEs as illustrated at step S5 in FIG. 8.

In 3GPP, TS 25.331, Section 10.3.6.35, Dynamic Persistence is a value in the range from 0 to 1 which is mapped to eight (8) different Dynamic Persistence levels. The threshold T can be set so that there is sufficient change in the DP value to indicate a change in Dynamic Persistence level. The positive and negative DeltaP increments are preferably selected so that a number, for example 10, of increments, either all positive or negative, will cause the threshold T to be met or exceeded. Thus, this selection will cause a change to DP only after 10 net determinations of "bad" or "good" measurements have been determined. When the threshold T is met or exceeded, preferably the value of temp dynamic persistence is then stored as the value of DP and the new DP (or DP level) is broadcast to the UEs as illustrated at step S5 in FIG. 8.

The desired operating point for maximum average number of successful RACH attempts per slot is very low for the relatively long acknowledgment cycle currently specified by 3GPP, one or two attempts per CUTS or lower. With a fast acknowledgment, a higher number of accesses, on the order of 3–5 per CUTS may be achieved. These rates are based on having eight (8) midambles and would vary accordingly if the number of midambles is changed.

Although a higher access rate increases the average throughput, the average UE would require multiple retransmissions before a RACH transmission is successful. Continued occurrences of many failures with very few successes are symptomatic of inadequate power. This is the basis for a power control adjustment via the RACH power constant.

Figure 2:
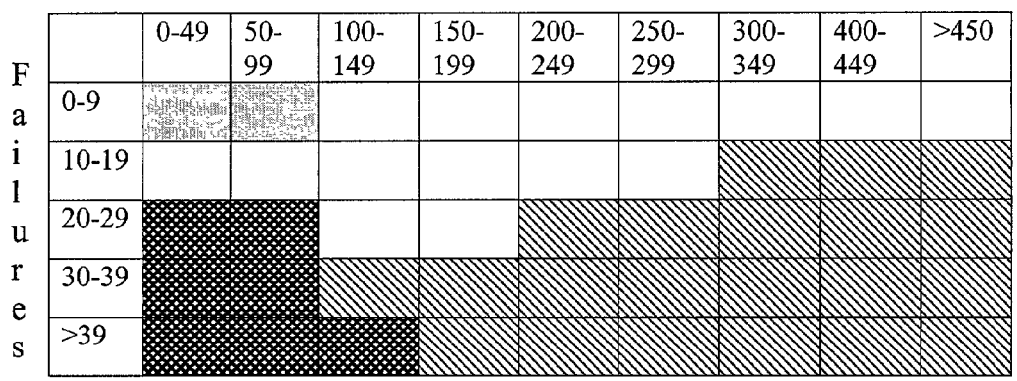
FIG. 2 is a table reflecting preferred parameters for the system referenced in FIG. 1 over a one second period where the frame duration is one microsecond.

A second embodiment as shown in FIG. 2, utilizes a matrix that stores the observations based on a longer time; e.g. for one second or for 100 frames. Distributions should begin to track the theoretical statistics for contention access. As with FIG. 1, for simplicity, the invention is explained with respect to a system where there is one RACH CUTS per frame, with eight (8) midambles available and which has one microsecond frames. Accordingly, there are 800 access opportunities per second.

Figure 3:
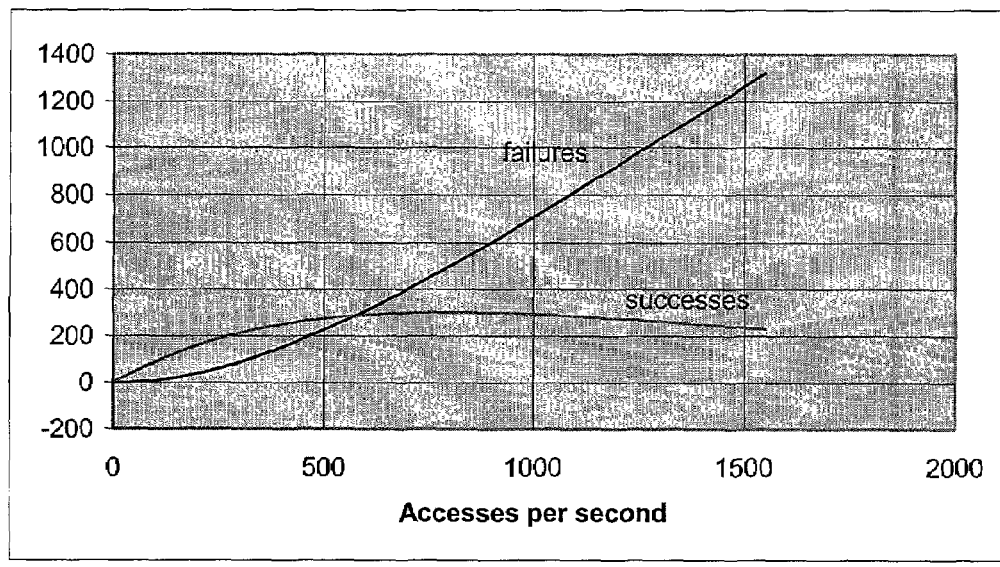
FIGS. 3 and 4 are graphs which reflect theoretical failure and success rates as functions of time for the system referenced in FIG. 1.
Figure 4:
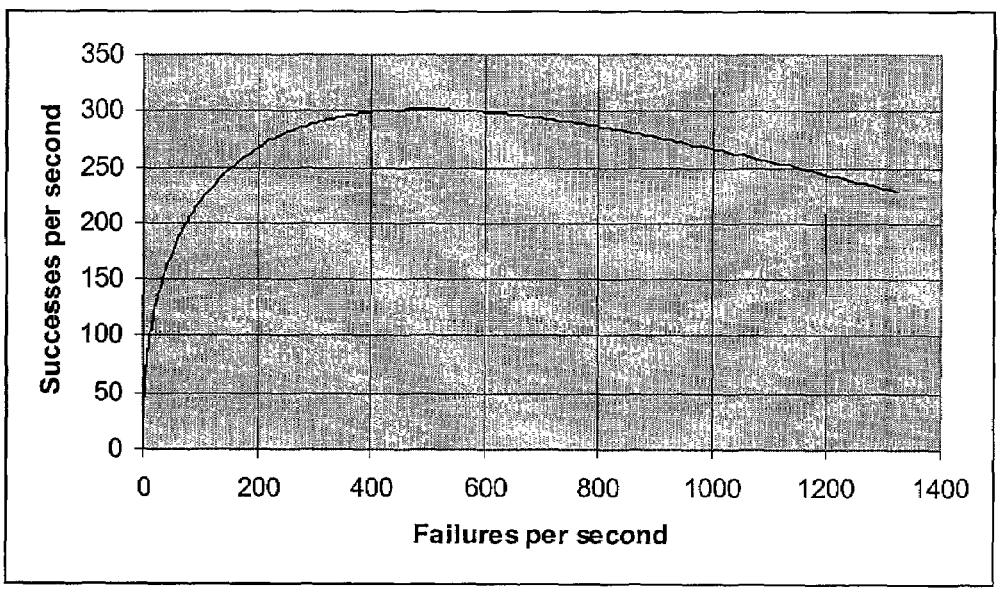

Using the elementary expression for contention access from the equations above, FIG. 3 shows successes and failures versus demand per second for the example system. FIG. 4 shows successes versus failures. Using FIG. 2, it is preferred to operate in the upper left region which is lightly shaded, (i.e. successes between 0 and 100; failures less than 10). DP can be adjusted by the method described in conjunction with FIG. 1 to force the system to operation in this region. If the statistics vary significantly from this curve, i.e. may more failures then would be predicted for a given level of successes, then this is indicative that the UEs are transmitting at inadequate power levels.

Adjustment of power levels is based on the principle that, when all RACH transmissions are sent at acceptable SNR, the successes versus failures follow a predictable curve based on the probability of collisions.

In 3GPP, per TS25.331, Section 8.5.7, TDD RACH power control is performed for the physical RACH (PRACH) as follows. The UE is specified to acquire Reference Power of the cell's beacon, RACH Constant and IBTS for the RACH timeslot from the Broadcast Channel and calculate the Uplink (UL) transmit power according to the following formula for the PRACH continuously while the physical channel is active:

> PPRACH=LPCCPCH+IBTS+RACH Constant value      Equation 4 where:
power level is in dBm;
3dB is added to RACH Constant for the case where RACH Spreading Factor=8,
LPCCPCH is a measurement representing path loss in dB based on the beacon channel, currently specified as an integer from 6 to 43;
IBTS is Interference signal power level at cell's receiver in dBm, currently specified as an integer from −110 to −70. IBTS has the value of the IE "UL Timeslot Interference" (IE "UL Timeslot Interference" is broadcast from the RNC on BCH in System Information Block type 14 or individually signaled to each UE in the IE "Uplink DPCH Power Control" for each active uplink timeslot).

RACH Constant has the value of the IE "RACH Constant value", currently specified as an integer from −35 to −10.

The RNC adjusts the RACH constant value based on the statistics for RACH failures and RACH successes. FIG. 2 illustrates a table of successes per unit time (e.g. 1 second) versus failures per unit time with preferred shading as predicted by a "best curve" illustrated in FIGS. 3 and 4 which are derived from the theoretical mathematics described above.

Once a RACH Constant value is selected, statistics on RACH failures and RACH successes are collected. If the ratio of RACH failures to RACH successes exceeds the "best curve", based only on collisions as indicated by the lower left cross shaded areas, then the RACH Constant value is increased.

If the ratio of RACH failures to RACH successes closely tracks the expected curve, as indicated by the two upper left lightly shaded boxes, then the RACH constant value is decreased. The reduction increment is preferably relatively small. The exact value may be optimized based on experience, but should be on the order of 1 dB. Once the observed statistics again show more than the "best" failure rate, the lower left cross shaded area, the RACH constant is incrementally increased. The increase value increment is preferably the same as the decrease value increment, but the increments can be different if desired.

The "best curve" is preferably based on the theoretical predictions shown in FIGS. 3 and 4. To allow for the real world fact that the actual relationship between successes and failures may deviate from the theoretical predictions, the "best curve" can be "learned" through continued use. The learning process is preferably based on the fact that, there will be a RACH constant, above which, there will be no observed improvement (i.e. reduction in failures versus successes).

As an alternative to adjusting DP in accordance with the method described above in connection with FIG. 1, a DP adjustment method can similarly be implemented based on accumulated success/failure determination data with reference to the table of FIG. 2. In such case, DP would be increased where the determination data fall either in the cross shaded or diagonally shaded areas of the lower portion of the FIG. 2 Table and DP would be decreased where the determination data falls in the two upper left lightly shaded boxes of the FIG. 2 Table.

Although the invention has been described in terms of specific embodiments related to 3GPP systems having one CUTS per a one microsecond frame structure and eight code identifying midambles, it is not limited in its application to such specific parameters.

What is claimed is:

1. In a telecommunications system in which a plurality of User Equipments (UEs) communicate with a common station via communication signals having a system frame format with at least one commonly used time slot (CUTS) per frame which is available for common use by the UEs for transmitting code identified signals for a specific uplink channel, where the UEs select a code identifier from a plurality of identifiers and where a UE transmission with a selected code identifier in a selected CUTS will fail if another UE transmits with the same code identifier in the same CUTS or if the UE transmission lacks sufficient power, a communication method comprising:
   determining the number of successful and failed UE transmissions in CUTSs per frame that are received by the common station from the plurality of UEs;
   adjusting one or more communication parameters, including a dynamic persistence parameter (DP) or a power control parameter (R), in response to said determination; and
   broadcasting by the common station the adjusted one or more communication parameters.

2. The method of claim 1 wherein the number of successful and failed UE transmissions in CUTSs is determined for individual system frames comprising:
   adjusting DP in response to the individual system frame determinations; and
   broadcasting DP upon which the UEs determine an access rate for transmitting in CUTSs.

3. The method of claim 2 wherein the specific uplink channel is a Random Access Channel (RACH), the common station comprises a radio network controller (RNC), one CUTS is provided per each system frame, eight code identifiers are provided as midambles for UE transmissions and DP is dynamic persistence or dynamic persistence level.

4. The method of claim 1 wherein the number of successful and failed UE transmissions in CUTSs is determined for multiple system frames spanning a selected time interval.

5. The method claim of 4 comprising:
   adjusting R in response to said determination over the selected time interval whereby the UEs adjust their transmission power after receiving an adjusted value for R in accordance with that adjusted value; and
   broadcasting R to the UEs.

6. The method of claim 5 wherein the specific channel is a Random Access Channel (RACH), eight code identifiers are provided as midambles for UE transmissions and R is a RACH power control parameter.

7. The method of claim 5 wherein the system frame is 10 microseconds and the selected time interval is 1 second so that the determination is based upon 100 frames.

8. The method of claim 7 wherein the specific channel is a Random Access Channel (RACH), eight code identifiers are provided as midambles for UE transmissions and R is a RACH power control parameter.

9. The method of claim 5 wherein the number of successful and failed UE transmissions in CUTSs is also determined for individual system frames, further comprising:
   adjusting DP in response to the individual system frame determinations; and
   broadcasting DP upon which the UEs determine an access rate for transmitting in CUTSs.

10. The method of claim 9 wherein the specific channel is a Random Access Channel (RACH), eight code identifiers are provided as midambles for UE transmissions, R is a RACH power control parameter and DP is dynamic persistence or dynamic persistence level.

11. The method of claim 9 wherein the system frame is 10 microseconds and the selected time interval is 1 second so that the determination is based upon 100 frames.

12. The method of claim 11 wherein the specific channel is a Random Access Channel (RACH), eight code identifiers are provided as midambles for UE transmissions, R is a RACH power control parameter and DP is dynamic persistence or dynamic persistence level.

13. The method of claim 4 wherein the specific channel is a Random Access Channel (RACH), further comprising:
   adjusting DP in response to said determination over the selected time interval whereby the UEs adjust their access rate to CUTS after receiving an adjusted value for DP in accordance with that adjusted value; and
   broadcasting DP upon which the UEs determine an access rate for transmitting in CUTSs.

14. The method of claim 13 wherein the system frame is 10 microseconds and the selected time interval is 1 second so that the determination is based upon 100 frames, eight code identifiers are provided as midambles for UE transmissions and DP is dynamic persistence or dynamic persistence level.

15. The method of claim 4 wherein the system frame is 10 microseconds, the selected time interval is 1 second, the common station comprises a radio network controller (RNC), eight code identifiers are provided as midambles for UE transmissions and the specific uplink channel is a Random Access Channel (RACH).

16. The method claim of 15 further comprising:
adjusting a RACH parameter in response to said determination over the selected time interval whereby the UEs adjust their transmission power after receiving an adjusted value for said RACH parameter in accordance with that adjusted value;
broadcasting said RACH power control parameter to the UEs;
adjusting DP in response to said determination over the selected time interval whereby the UEs adjust their access rate to CUTS after receiving an adjusted value for DP in accordance with that adjusted value; and
broadcasting DP upon which the UEs determine an access rate for transmitting in CUTSs.

17. A common station configured for use in a telecommunications system in which a plurality of User Equipments (UEs) communicate with the common station via communication signals having a system frame format with at least one commonly used time slot (CUTS) per frame which is available for common use by the UEs for transmitting code identified signals for a specific uplink channel, where the UEs select a code identifier from a plurality of identifiers and where a UE transmission with a selected code identifier in a selected CUTS will fail if another UE transmits with the same code identifier in the same CUTS or if the UE transmission lacks sufficient power, the common station comprising:
a memory configured to store the number of successful and failed UE transmission in CUTSs per frame;
processing circuitry configured to determine whether UE transmission in CUTSs succeed or fail and storing determination results as data in the memory;
said processing circuitry further configured to adjust one or more communication parameters, including a dynamic persistence parameter (DP) or a power control parameter (R), based on the data stored in said memory; and
means for broadcasting said adjusted communication parameters.

18. The common station of claim 17 wherein the common station processing circuitry is configured to determine and store the number of successful and failed UE transmissions in CUTSs for individual system frames and to adjust DP, upon which the UEs determine an access rate for transmitting in CUTSs, based on stored data reflecting the individual system frame determinations.

19. A telecommunications system comprising:
a plurality of User Equipments (UEs);
a common station configured to communicate with said UEs via communication signals having a system frame format with at least one commonly used time slot (CUTS) per frame which is available for common use by the UEs for transmitting code identified signals for a specific uplink channel, where the UEs select a code identifier from a plurality of identifiers and where a UE transmission with a selected code identifier in a selected CUTS will fail if another UE transmits with the same code identifier in the same CUTS or if the UE transmission lacks sufficient power;
said common station including:
a memory configured to store the number of successful and failed UE transmission in CUTSs per frame; and
processing circuitry configured to determine whether UE transmission in CUTSs succeed or fail, to store the determination results as data in the memory and to adjust one or more communication parameters, including a dynamic persistence parameter (DP) or a power control parameter (R), based on the data stored in said memory; and said common station processing circuitry further configured to determine and store the number of successful and failed UE transmissions in CUTSs for multiple system frames spanning a selected time interval and to adjust R, upon which the UEs determine a power level for transmitting in CUTSs, based on stored data reflecting the determinations over the selected time interval.

20. The system of claim 19 wherein the common station includes a node b which is interfaced with a Radio Network Controller (RNC) where the node b has the processing circuitry which is configured to determine whether UE transmission in CUTSs succeed or fail and the RNC has the memory configured to store the number of successful and failed UE transmission in CUTSs per frame and the processing circuitry which is configured to adjust one or more communication parameters based on the data stored in said memory.

* * * * *

UNITED STATES PATENT AND TRADEMARK OFFICE
CERTIFICATE OF CORRECTION

PATENT NO. : 7,072,327 B2
APPLICATION NO. : 09/995144
DATED : July 4, 2006
INVENTOR(S) : Stephen G. Dick It is certified that error appears in the above-identified patent and that said Letters Patent is hereby corrected as shown below:

IN THE ABSTRACT
ON TITLE PAGE

Item (57), ABSTRACT, page 1, right column, line 2, before the words "with a", delete "communicate" and insert therefor --communicates--.

Item (57), ABSTRACT, page 1, right column, lines 12 & 13, after "failed UE", delete "transmission" and insert therefor --transmissions--.

Column 1, line 34, before "FIG. 5", delete "if" and insert therefor --in--.

Column 1, line 48, before the word "depicted", delete "examvle" and insert therefor --example--.

Column 3, line 1, after the word "Controller", delete "(RCN)" and insert therefor --(RNC)--.

Column 3, line 15, after the words "failed UE", delete "transmission" and insert therefor --transmissions--.

Column 4, line 29, after the word "illustrated", delete "if" and insert therefor --in--.

Column 4, line 57, after the words "transmissions are", delete "receive" and insert therefor --received--.

Column 6, line 28, after the words "system to", delete "operation" and insert therefor --operate--.

Column 6, line 30, before the words "would be", delete "may more failures then" and insert therefor --many more failures than--.

Column 6, line 46, delete Equation 4, and insert therefor
--PRACH = LPCCPCH + IBTS + RACH Constant value--.

UNITED STATES PATENT AND TRADEMARK OFFICE
CERTIFICATE OF CORRECTION

PATENT NO. : 7,072,327 B2
APPLICATION NO. : 09/995144
DATED : July 4, 2006
INVENTOR(S) : Stephen G. Dick It is certified that error appears in the above-identified patent and that said Letters Patent is hereby corrected as shown below:

IN THE CLAIMS

Claim 16, column 9, line 10, after the word "method", delete "claim of" and insert therefor --of claim--.

Claim 17, column 9, line 38, after the words "failed UE", delete "transmission" and insert therefor --transmissions--.

Claim 19, column 10, line 22, after the words "failed UE", delete "transmission" and insert therefor --transmissions--.

Claim 20, column 10, line 45, after the words "failed UE", delete "transmission" and insert therefor --transmissions--.

Signed and Sealed this

Sixteenth Day of January, 2007

JON W. DUDAS
*Director of the United States Patent and Trademark Office*